US009280578B1

(12) United States Patent
Zhou et al.

(10) Patent No.: US 9,280,578 B1
(45) Date of Patent: Mar. 8, 2016

(54) COMBINING TRANSACTIONS IN A METADATA TRANSACTION LOG

(71) Applicant: EMC Corporation, Hopkinton, MA (US)

(72) Inventors: Yingchao Zhou, Beijing (CN); William C. Davenport, Burlington, MA (US); Jia Zhai, Beijing (CN)

(73) Assignee: EMC Corporation, Hopkinton, MA (US)

( * ) Notice: Subject to any disclaimer, the term of this patent is extended or adjusted under 35 U.S.C. 154(b) by 210 days.

(21) Appl. No.: 13/931,979

(22) Filed: Jun. 30, 2013

(51) Int. Cl.
*G06F 17/30* (2006.01)
*G06F 17/00* (2006.01)

(52) U.S. Cl.
CPC .............................. *G06F 17/30371* (2013.01)

(58) Field of Classification Search
CPC ............ G06F 17/30171; G06F 17/30224; G06F 9/44552; G06F 9/54; G06F 17/30227; G06F 9/524; G06F 9/542; G06F 17/30106; G06F 17/30; G06F 17/30902; G06F 9/52; G06F 11/0715; G06F 11/1417; G06F 11/1441; G06F 11/3636; G06F 11/366; G06F 2209/523
USPC .......................................... 707/602, 747, 822
See application file for complete search history.

(56) References Cited

U.S. PATENT DOCUMENTS 5,950,199 A * 9/1999 Schmuck et al.
6,665,675 B1 * 12/2003 Mitaru

OTHER PUBLICATIONS

Weigang Zhong, et al., "Efficient Management of File System Quota Trees", U.S. Appl. No. 13/715,348, filed Dec. 14, 2012.
Kumar Kanteti, et al., "Managing Metadata Synchronization for Reducing Host System Latency in a Storage System", U.S. Appl. No. 13/834,385, filed Mar. 15, 2013.
Michael Scheer, et al., "Segregating Data and Metadata in a FLE System", U.S. Appl. No. 13/930,506, filed Jun. 28, 2013.
Diane M. Delgado, et al., "Coalescing Transactional Same-Block Writes for Virtual Block Maps", U.S. Appl. No. 13/929,999, filed Jun. 28, 2013.
Yingchao Zhou, et al., "A Filesystem Storing File Data in Larger Units Than Used for Metadata", U.S. Appl. No. 13/928,972, filed Jun. 27, 2013.
Uresh Vahalia, et al., "Metadata Logging in an NFS Server," TCON'95 Proceedings of the USENIX 1995 Technical Conference Proceedings, Jan. 1995, pp. 265-276, USENIX Association, USA.

* cited by examiner

*Primary Examiner* — Yicun Wu
(74) *Attorney, Agent, or Firm* — BainwoodHuang

(57) ABSTRACT

Techniques are provided involving combining several concurrent changes into one consistent condensed transaction within a metadata transaction log using an accumulation list that can be processed to generate a single transaction which may be quickly stored in the metadata transaction log. The improved techniques thus reduce latencies for later concurrent changes and save space within the metadata transaction log.

22 Claims, 4 Drawing Sheets

COMBINING TRANSACTIONS IN A METADATA TRANSACTION LOG

BACKGROUND

Files and directories are organized within filesystems of data storage so that they are readily-retrievable by users and applications. Filesystems make use of metadata in order to organize the data stored within the filesystem into files. Certain changes to files can require several simultaneous metadata changes. It is important that all of the simultaneous metadata changes are actually made together so that the metadata can be kept in a consistent state, lest the filesystem be corrupted or need to be taken off-line for extensive reconstruction.

In order to ensure the integrity of the metadata, many systems implement a metadata transaction log, allowing changes to metadata to be logged prior to being implemented in the filesystem metadata itself. The logged changes are maintained until the metadata is successfully implemented in the filesystem metadata. Thus, if the system crashes in the middle of a metadata update with the filesystem metadata in an inconsistent state, the metadata transaction log can be replayed to fix the metadata inconsistency.

SUMMARY

However, the above-mentioned conventional systems may suffer deficiencies. For example, two simultaneous changes made to a single file cannot be written to the metadata transaction log at the same time, since the changes may both modify the same portions of the metadata in inconsistent ways. Thus, a second change made to the same file as a first change must wait until the first change has been persisted to the metadata transaction log and the metadata has been updated in the system cache. If a third change is requested to the file while the second change is waiting, the third change will have to wait until transaction logging for both the first change and the second change have completed.

Thus, concurrent changes to the same file can suffer from high latencies as later-processed changes must wait for all previously-processed changes to the same file to be persisted and updated in the cache. This can be particularly problematic when there is a very high transaction volume for a file, for example, in a database context. In addition, transactions stored within the metadata transaction log for some concurrent changes to the same file may contain redundant information, reducing the number of changes that can be stored within a fixed-size metadata transaction log at once.

Thus, it would be desirable for a filesystem to be able to reduce the average latency for multiple concurrent changes to a file. It would also be desirable to optimize the storage requirements of the metadata transaction log.

In contrast with the prior approach, improved techniques involve combining several concurrent changes into one consistent transaction within the metadata transaction log using an accumulation list that can be processed to generate a single transaction which may be quickly stored in the metadata transaction log. The improved techniques thus reduce latencies for later concurrent changes and save space within the metadata transaction log.

Some embodiments are directed to a method performed by a computing device for logging metadata changes of a filesystem. The method includes (a) receiving, from a client, a first change request directing the filesystem to make a first modification to a file, (b) operating a first processing thread on the computing device to perform processing for making the first modification to the file, (c) receiving, from the client, a second change request directing the filesystem to make a second modification to the file, (d) operating a second processing thread in parallel with the first thread on the computing device, the second thread performing processing for making the second modification to the file, (e) storing, by the first thread, a description of the first modification in a list stored in system memory in response to the file being in a locked state, (f) storing, by the second thread, a description of the second modification in the list stored in system memory in response to the file continuing to be in a locked state, and (g) in response to detecting that the file has been unlocked, saving a condensed metadata transaction entry to a metadata transaction log in persistent storage, the condensed metadata transaction entry providing, in the form of a single transaction, metadata changes required for implementing both the first modification and the second modification. Other embodiments are directed to a computerized apparatus, computerized system, and a computer program product configured to perform a method similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques involving combining several concurrent changes into one consistent transaction within a metadata transaction log using an accumulation list that can be processed to generate a single transaction which may be quickly stored in the metadata transaction log. The improved techniques thus reduce latencies for later concurrent changes and save space within the metadata transaction log.

Figure 1:
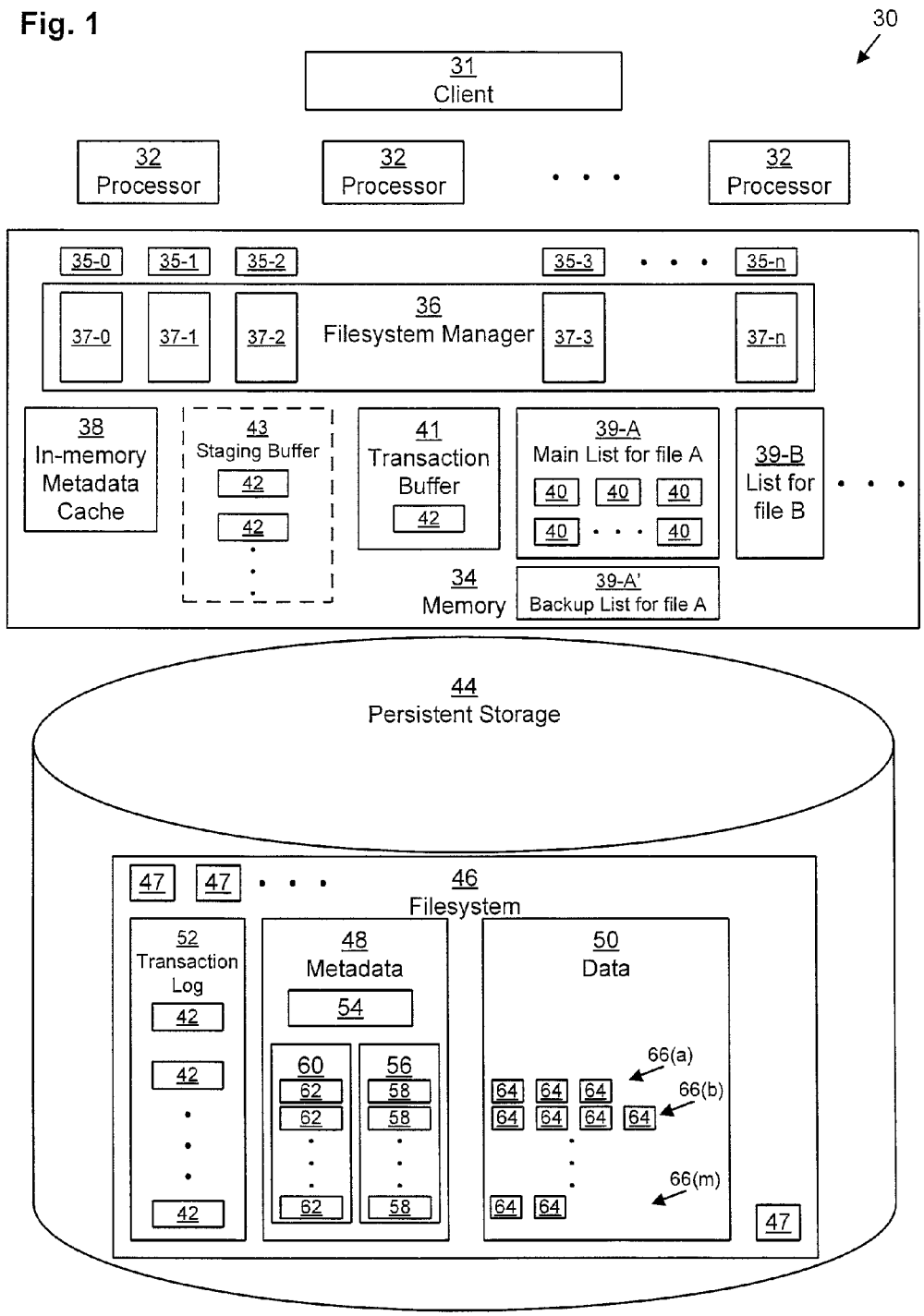
FIG. 1 depicts an example data storage system according to various embodiments.

FIG. 1 depicts an example data storage system (DSS) 30, such as, for example, a NAS data storage system, which provides access to one or more filesystems 46 stored thereon. In some embodiments, DSS 30 may be a single computing device, such as, for example, a personal computer, a workstation, a server, an enterprise server, etc. In one particular example embodiment, DSS 30 is an enterprise data storage system including a cabinet housing multiple storage processors as well as multiple shelves of disk drives, flash drives, and/or solid state drives (SSDs). An example of an enterprise data storage system is the VNX series data storage system provided by the EMC Corp. of Hopkinton, Mass. In other embodiments, DSS 30 may be distributed across several computing devices or other structures.

In some embodiments, DSS 30 includes a network interface (not depicted) and/or a user interface (UI) (not depicted) which allow DSS 30 to communicate with a client 31 via UI devices (not depicted). The optional UI may include, for example, one or more of the following, a graphics adapter, a serial port, a parallel port, a Universal Serial Bus adapter, etc.

UI devices may include input devices as well as output devices. Example UI devices include a display monitor and a keyboard. Other example UI devices could include a printer, a touch screen, a mouse, etc. The optional network interface is configured to connect DSS 30 to a computer network, such as, for example, a local area network, a wide area network, the Internet, a storage area network, a fabric of interconnected hubs and switches, etc.

DSS 30 includes one or more processors 32. Processors 32 may be any kind of processors configured to perform operations, such as, for example, microprocessors, multi-core microprocessors, digital signal processors, collections of electronic circuits, or any combination of the above.

DSS 30 also includes memory 34. Memory 34 may include any kind of digital system memory, such as, for example, RAM. Memory 34 stores programs executing on processor 32 as well as data used by those programs. Memory 34 may store an operating system (OS) (not depicted) which runs on processor 32. Memory 34 stores a filesystem manager 36 which runs on processor 32 and serves to manage a filesystem 46 stored within the DSS 30 in an improved manner in accordance with embodiments described herein.

Memory 34 also stores a set of client file change requests 35 (depicted as client file change requests 35-0, 35-1, 35-2, 35-3, . . . , 35-$n$), which are requests received from client 31 to make a change to a file. Typically, each client file change request 35 is processed by a different processing thread 37 (depicted as threads 37-0, 37-1, 37-2, 37-3, . . . , 37-$n$) of the filesystem manager 36 executing on one or more of processors 32. The various threads 37 may be configured to execute in parallel on processors 32. Thus, for example, thread 37-1 may execute on a first processor 32 while thread 37-2 executes on a second processor 32. However, two or more of the various threads 37 may also execute in parallel on the same processor 32, meaning that control of a particular processor 32 may pass back-and forth between two parallel threads 37 in a time-sharing arrangement, although, under certain conditions, one thread 37 may temporarily pause in favor of other threads while waiting for a resource, for example.

Memory 34 also stores an in-memory metadata cache 38, a set of file lists 39, each of which may contain a set of change descriptions 40, and a transaction buffer 41, which may contain a metadata transaction entry 42. Memory 34 may also store a staging buffer 43 in the context of various embodiments. Staging buffer 43 may contain one or more metadata transaction entries 42.

In addition to system memory for storing programs and data in active use by the processor 32, memory 34 may also include persistent storage (e.g., solid-state storage and/or disk-based storage) for storing programs and data even while the DSS 30 is powered off. In some embodiments, this persistent storage may additionally (or exclusively) be included within persistent storage 44. OS and filesystem manager 36 are typically stored both in system memory and in persistent storage so that they may be loaded into system memory from persistent storage upon a system restart.

The techniques described herein, when embodied in one or more non-transient computer-readable media (e.g., filesystem manager 36 stored within either system memory or persistent storage of memory 34), forms a computer program product. Also, the DSS 30, or portions thereof, forms a specialized circuit constructed and arranged to carry out the various processes described herein.

DSS 30 also includes persistent storage 44, such as one or more hard disk drives and SSDs connected either by an internal bus or via a network (e.g., a storage area network). Persistent storage 44 may be arranged in a fault tolerant arrangement, such as in a redundant array of independent disks (RAID), as is well-known in the art. A storage controller (not depicted) may provide the processor 32 and memory 34 with access to the persistent storage 44.

Persistent storage 44 stores at least one filesystem 46. Filesystem 46 may be arranged as a series of individually-addressable blocks 47 of equal size. In some embodiments, each block 47 may be subdivided into several individually-addressable sectors of equal size. For example, in a typical embodiment, each sector is 512 bytes, while each block 47 is 8 kilobytes (KB), being made up of 16 consecutive sectors. It should be understood that these values are by way of example only. Indeed various sector and block sizes are possible. The sector size may be any value, but is often a power of 2, such as 256, 512, 1024, or 2048 bytes. The block size may also be of any value, but is often a power of 2 multiple (e.g., 4, 8, 16, 32, or 64) of the sector size, such as 2 KB, 4 KB, 8 KB, 16 KB, 32 KB, 64 KB, or 128 KB. Filesystem 46 includes both data 50 (i.e., user data stored by a user or application) as well as metadata 48 (e.g., information about the structure and layout of the data 50 within the filesystem 46). Filesystem 46 also includes a transaction log 52, which is a circular log that stores a set of sequential metadata transaction entries 42. In some embodiments, transaction log 52 is stored within non-volatile or battery-backed DRAM or DRAM which is mirrored between two independent machines, any of which is deemed to be persistent and therefore part of persistent storage 44.

In some embodiments, metadata 48 includes a set of filesystem metadata 54. Filesystem metadata 54 may include, for example, a superblock of the filesystem 48 as well as one or more allocation bitmaps. A block allocation bitmap may be arranged as an ordered set of bits, each bit representing one block 47 (or, in some embodiments, one sector) of filesystem 46. The value of each bit within the block allocation bitmap is set to 1 when the block 47 that it represents is allocated and to 0 when the block 47 that it represents is unallocated.

Metadata 48 may also include an inode table 56, the inode table 56 storing a set of inodes 58, and a set 60 of indirect blocks 62. Data 50 may include a set of data blocks 64, which are blocks 47 that store data of user files 66 (depicted as files 66($a$), 66($b$), . . . , 66($m$)). Each file 66 has a respective inode 58 and may also (depending on its size) have one or more indirect blocks 62. The inode 58 for a file 66 points to data blocks 64 of the file 66, and if there are more data blocks 64 than can be pointed to by the inode 58 (in one implementation, if there are more than 18 data blocks 64), additional data blocks 64 are pointed to by the indirect blocks 62.

Figure 2:
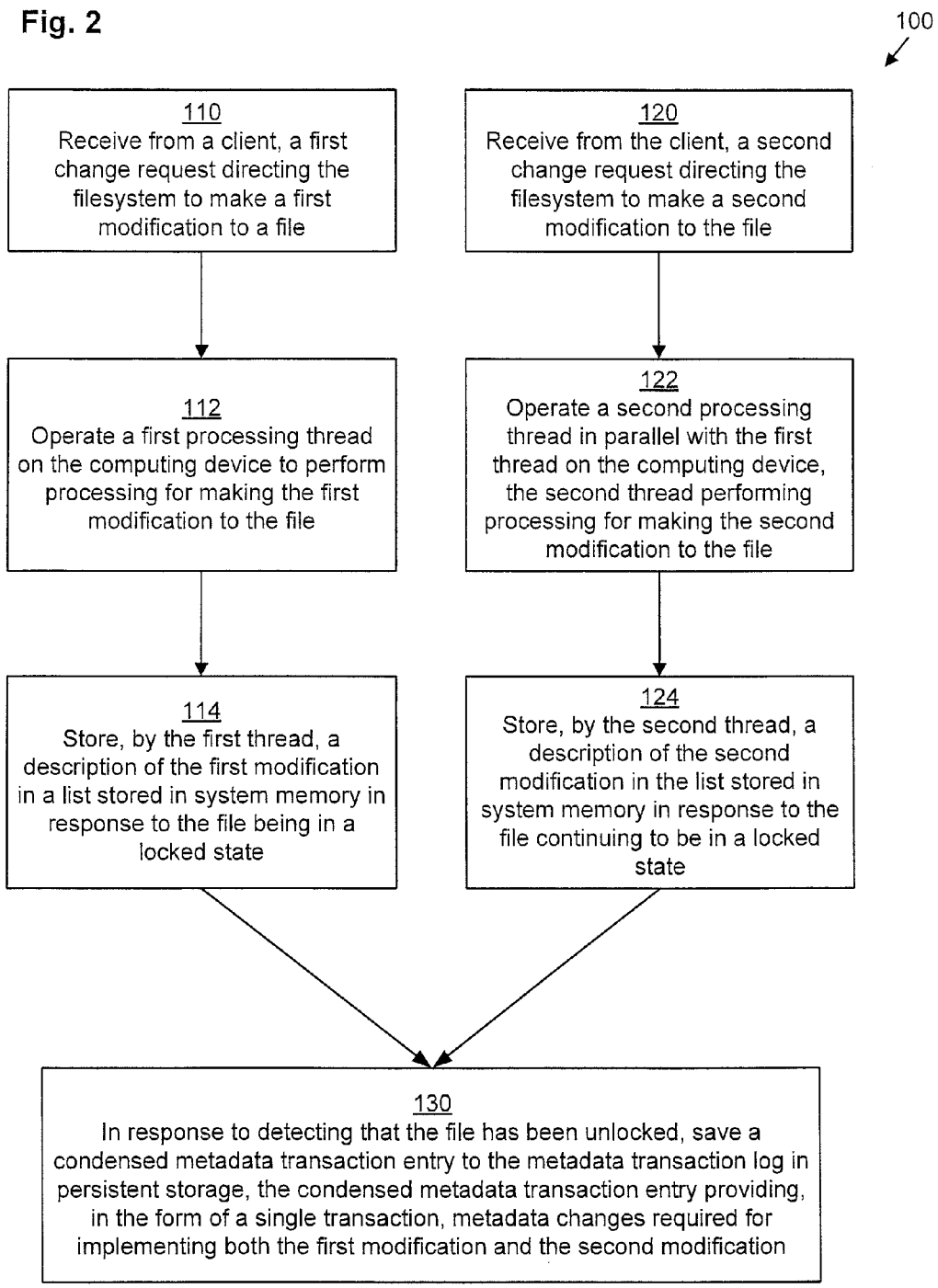
FIG. 2 depicts an example method according to various embodiments.

FIG. 2 depicts an example method 100 performed by the DSS 30 in accordance with various embodiments. Method 100 may be performed by filesystem manager 36. It should be understood that any time a piece of software, such as, for example, filesystem manager 36, is described as performing a method, process, step, or function, in actuality what is meant is that a computing device (e.g., DSS 30) on which that piece of software is running performs the method, process, step, or function when executing that piece of software on its processor(s) (e.g., processors 32).

In step 110, filesystem manager 36 receives a first change request (e.g., file change request 35-1) directing that a first modification be made to a particular file (e.g., file 66($a$)). For example, the first modification may be a write operation, such as appending data to the end of the file 66($a$). In step 112, a first processing thread (e.g., thread 37-1) of filesystem manager 36 operates to perform processing to implement the first modification to the file 66($a$). For example, if the first modification is a write operation to append 16 KB of data to the end of the file 66(*a*), then, in step 112, first thread 37-1 may preliminarily allocate 2 blocks 47 (e.g., blocks with addresses 912 and 913) of the filesystem as data blocks 64 and store the new data within those blocks.

In step 114, it happens that the file 66(*a*) is locked. The file 66(*a*) may be locked because another thread is in the process of making a metadata change to the file 66(*a*), so any changes made at this stage could lead to inconsistencies. See, for example, method 200 of FIG. 3, below. The file 66(*a*) may be locked by means of a semaphore or a mutex as is known in the art. Because the file 66(*a*) is locked, the first thread 37-1 is not able to immediately process a metadata change for the file 66(*a*). Instead, it stores a description of the first modification as a change description 40 within a list 39 for that file 66(*a*) (e.g., main list for file A 39-A). In the case of the example write operation, change description 40 might be of the form, "Store blocks 912-913 in the file at block offset 42-43 of the file" (although it will be appreciated that the change description 40 may use instruction codes to store this in a more compact computer-readable form). First thread 37-1 then pauses at least until the file 66(*a*) is unlocked.

In parallel with steps 110-114, filesystem manager 36 also executes steps 120-124. In step 120, filesystem manager 36 receives a second change request (e.g., file change request 35-2) directing that a second modification be made to the same file (e.g., file 66(*a*)). For example, the second modification may also be a write operation, such as appending data to the end of the file 66(*a*). In step 122, a second processing thread (e.g., thread 37-2) of filesystem manager 36 operates to perform processing to implement the second modification to the file 66(*a*). For example, if the second modification is a write operation to append 24 KB of data to the end of the file 66(*a*), then, in step 122, second thread 37-2 may preliminarily allocate 3 blocks 47 (e.g., blocks with addresses 937, 938, and 939) of the filesystem as data blocks 64 and store the new data within those blocks.

In step 124, it again happens that the file 66(*a*) is locked. Because the file 66(*a*) is locked, the second thread 37-2 is not able to immediately process a metadata change for the file 66(*a*). Instead, it stores a description of the second modification as a change description 40 within a list 39 for that file 66(*a*) (e.g., main list for file A 39-A). In the case of the example write operation, change description 40 might be of the form, "Store blocks 937-939 in the file at block offset 45-47 of the file" (although it will be appreciated that the change description 40 may use instruction codes to store this in a more compact computer-readable form). Second thread 37-2 then pauses at least until the file 66(*a*) is unlocked.

At this point, it should be understood that additional threads 37 may also operate in a similar manner as thread 37-2 with respect to any additional file change requests 35 that come in from the client 31 while the file 66(*a*) remains locked. In such a case, more than two threads 37 would be paused at this point.

At some point, in step 130, once a previous modification to the file 66(*a*) has been completed (i.e., the transaction log 52 in persistent storage 44 has been updated to include a metadata transaction entry 42 that allows the previous modification to be replayed in case the metadata for that previous modification has not yet been stored within metadata 48 of filesystem 46; AND the in-memory metadata cache 38 has been updated to include a copy of the metadata elements [e.g., inodes 58, indirect blocks 62, and/or parts of an allocation bitmap of the filesystem metadata 54, etc.] in an updated state as of the completion of the previous modification to the file 66(*a*)), the file 66(*a*) may be unlocked (see below in connection with FIG. 3). In response to detecting that the file 66(*a*) has been unlocked, filesystem manager 36, with reference to the list 39-A, stores a condensed metadata transaction entry 42 to the metadata transaction log 52, the condensed metadata transaction entry 42 providing, in the form of a single transaction, metadata changes required for implementing both the first modification and the second modification in the form of a single transaction 42. Typically, one of the threads 37-1 or 37-2 performs this step 130. In one embodiment a first thread 37-1 to write to the list 39-A for the file 66(*a*) is assigned to perform this step 130, while in other embodiments, another thread 37 (e.g., a last thread, which, in the example would be second thread 37-2) that has written to the list 39-A for the file 66(*a*) is assigned to perform this step 130. Details with respect to the operation of step 130 according to one embodiment will be provided below, in connection with FIG. 4.

Figure 3:
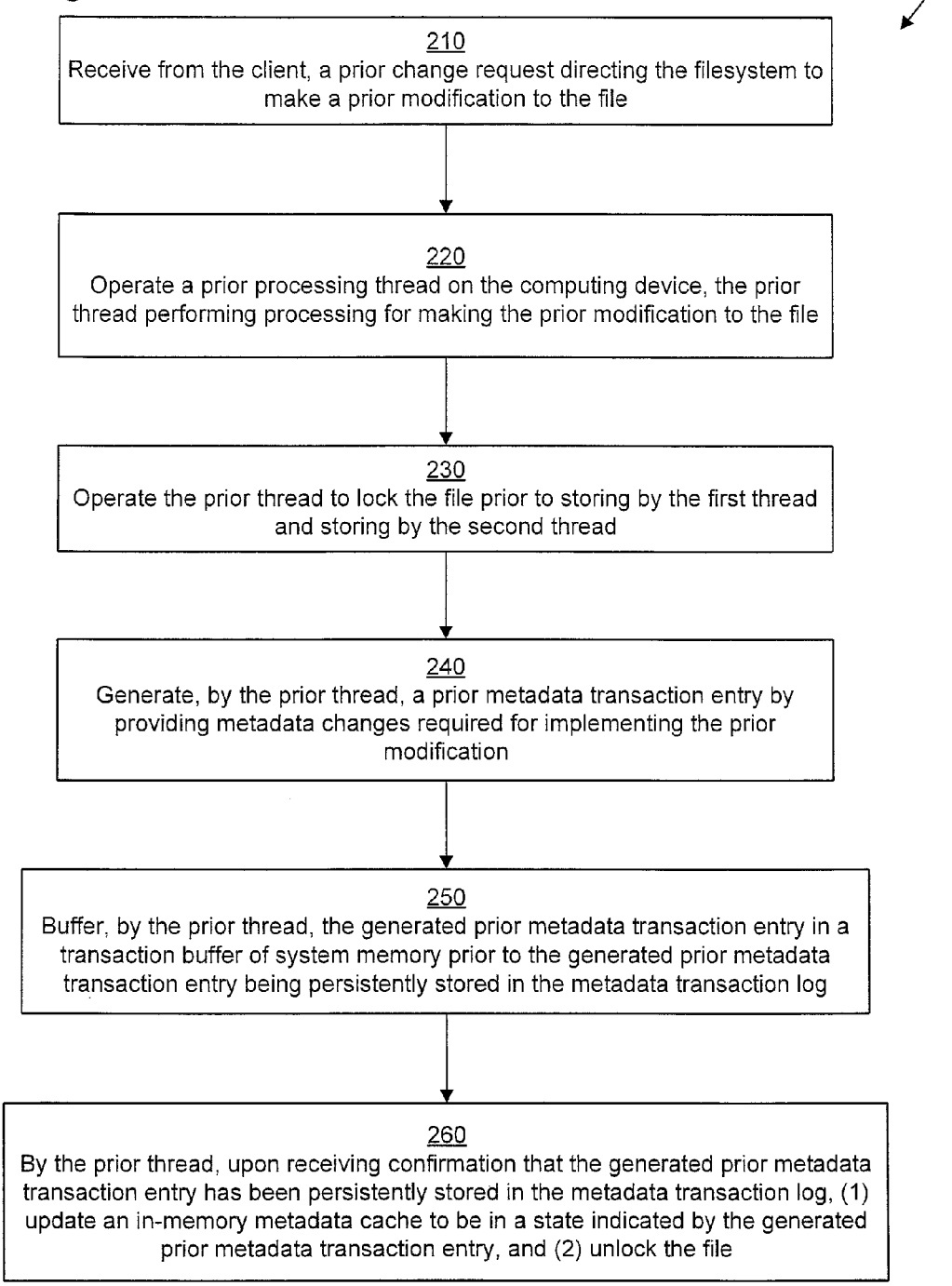
FIG. 3 depicts an example method according to various embodiments.

In some embodiments, method 100 necessarily is performed in conjunction with a method such as step 200, depicted in FIG. 3. Method 200 is thus performed in parallel with method 100. In step 210, filesystem manager 36 receives a prior change request (e.g., file change request 35-0) directing that a prior modification be made to the same file (e.g., file 66(*a*)). The prior change request is referred to as "prior" because it happens that the metadata for this prior change request is the first metadata ready to be committed to the file 66(*a*) while the file 66(*a*) is not yet locked (and no other modifications to the file 66(*a*) are pending, e.g., in list 39-A). For example, the prior modification may also be a write operation, such as appending data to the end of the file 66(*a*). In step 220, a prior processing thread (e.g., thread 37-0) of filesystem manager 36 operates to perform processing to implement the prior modification to the file 66(*a*). For example, if the prior modification is a write operation to append 8 KB of data to the end of the file 66(*a*), then, in step 220, prior thread 37-0 may preliminarily allocate 1 block 47 (e.g., a block with address 902) of the filesystem as a data block 64 and store the new data within that block.

Step 230 is performed prior to steps 114 and 124, by assumption/definition since the prior thread is "prior." In step 230, prior thread 37-0 operates to lock the file 66(*a*) in advance of committing new metadata associated with the prior modification. This may be done by means of a semaphore or a mutex. It should be noted that, in some embodiments, at this point, thread 37-0 also operates to lock the transaction buffer 41 and the transaction log 52 to prevent multiple threads 37 (even accessing different files 66) from accessing the same resources at the same time.

In step 240, after locking the file 66(*a*) (and, in some embodiments, also locking the transaction buffer 41 and the transaction log 52), prior thread 37-0 operates to generate a prior metadata transaction entry 42 by journaling metadata changes induced by applying the prior modification. For example, since the prior modification involves adding one block of data to the end of the file 66(*a*) (which, let us assume, has 41 complete blocks prior to processing the prior modification), the following metadata changes will be induced:

1) Mark block 902 as allocated in the block allocation bitmap
2) Add a pointer towards block 902 at offset 41 of the file 66(*a*) (which would be at offset 41−18=23 of the first indirect block 60 of the file 66(*a*), if an inode 58 contains up to 18 direct pointers)
3) Update the inode 58 of the file with the current time as the modification time (mtime) and the access time (atime) and with a new file size (e.g., 42×8 KB=336 KB).

In order to make these metadata changes concrete, the prior thread 37-0 will first make sure that the current metadata 48 pertaining to the file 66(*a*) is available in the in-memory metadata cache 38; if not, it will load the current metadata 48 pertaining to the file 66(*a*) from the persistent storage 44 into the in-memory metadata cache 38. In one embodiment, prior thread 37-0 will also load a copy of the inode 58 of the file 66(*a*) into a copy separate from the memory metadata cache 38 so that it can modify it. Prior thread 37-0 may also load byte int(902/8)=112 of the block allocation bitmap (let's assume it is equal to 11111100, indicating that blocks 896-901 are allocated and blocks 902-903 are unallocated currently). Thus, the prior metadata transaction entry 42 will include the following 3 instructions:

1) Store 11111110 in byte 112 of the block allocation bitmap
2) Store the 8-byte value (presented in hexadecimal for brevity) 0000000000000386 at pointer offset 23 of the indirect block
3) Store the following inode (not depicted, for brevity, but it should include the updates mtime, atime, and file size=336 KB) in place of the current inode.

In step 250, prior thread 37-0 buffers the prior metadata transaction entry 42 within transaction buffer 41 to be queued up to be written to the metadata transaction log 52 on persistent storage 44 as soon as possible. It should be understood that, in some embodiments, steps 240 and 250 are performed simultaneously, prior thread 37-0 generating the prior metadata transaction entry 42 directly within the transaction buffer 41. At this point, prior thread 37-0 must pause until it receives confirmation that the contents of transaction buffer 41 have been flushed to persistent storage 44 within metadata transaction log 52.

In some cases, instead of storing the prior metadata transaction entry 42 within transaction buffer 41, prior thread 37-0 may store prior metadata transaction entry 42 within staging buffer 43 (in embodiments that have a staging buffer 43) if the transaction buffer 41 and metadata transaction log 52 have been locked by another thread 37 operating on a different file 66 (e.g., file 66(*b*)) as long as prior thread 37-0 is the first of the concurrent threads 37 to begin processing metadata 48 for the file 66(*a*) (as evidenced by the file 66(*a*) having been unlocked as of the beginning of step 230). In such a case, prior thread 37-0 instead pauses until the transaction buffer 41 and metadata transaction log 52 become unlocked and the contents of the staging buffer 43 are flushed out to the metadata transaction log 52 on persistent storage 44.

In step 260, upon receiving confirmation that the prior metadata transaction entry 42 has been persistently stored in the metadata transaction log 52, the prior thread 37-0 wakes up and operates to store updated metadata 48 pertaining to the file 66(*a*) consistent with the prior metadata transaction entry 42 in the in-memory metadata cache 38 and then unlock the file 66(*a*). At this time, prior thread 37-0 may also report back to the client 31 that the prior modification has been completed and the prior thread 37-0 may then terminate. At some point after this is done, in a background process, the updated metadata 48 pertaining to the file 66(*a*) consistent with the prior metadata transaction entry 42 will also be committed to the persistent storage 44 in-place, at which point, the prior metadata transaction entry 42 may be removed from the metadata transaction log 52. However, this is not urgent and does not hold up unlocking the file 66(*a*), reporting back to the client 31, or allowing the prior thread 37-0 to die.

As soon as the file 66(*a*) is unlocked by prior thread 37-0 in step 260, any pending modifications from threads waiting for the file 66(*a*) to be unlocked may proceed to be committed to storage in step 130.

Figure 4:
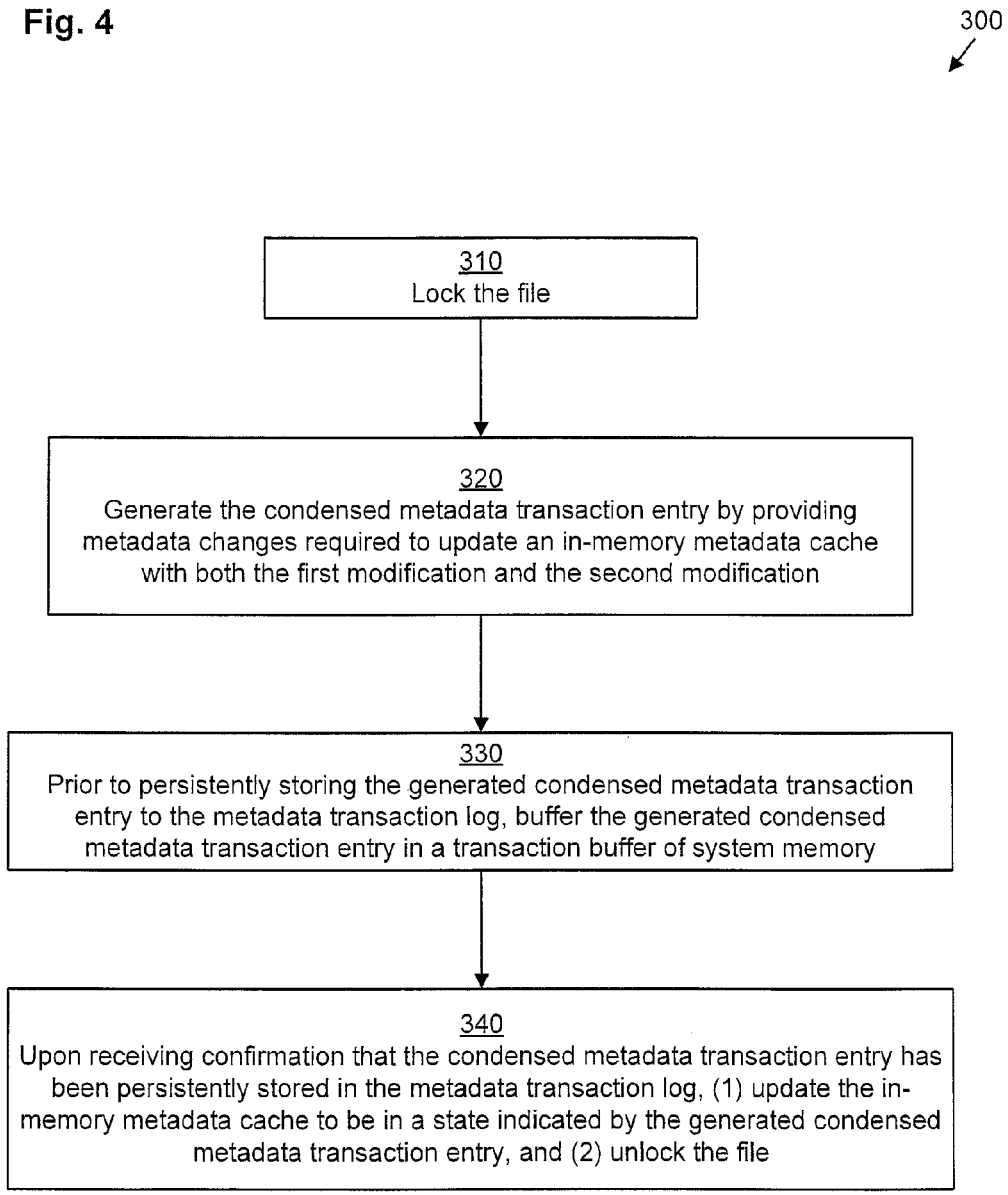
FIG. 4 depicts an example method according to various embodiments.

FIG. 4 depicts step 130 in further detail according to one embodiment, as method 300. In step 310, since the file 66(*a*) has now been unlocked, one of the threads 37-1, 37-2 begins by claiming the file 66(*a*) and locking it. Any of the threads paused waiting for step 130 may, in theory, take control at this point, but, typically, any implementation will provide criteria by which to decide which thread 37 takes control. For example, in one implementation, the first thread 37-1 always takes control, while in another implementation, the last thread 37 always takes control. For the remainder of the discussion of method 300, it will be assumed that first thread 37-1 takes control and therefore executes method 300.

In step 320, once the file 66(*a*) has been locked by the first thread 37-1, first thread 37-1 proceeds to generate the condensed metadata transaction entry 42 by sequentially journaling metadata changes induced by applying the first modification and the second modification (as indicated by the change descriptions 40 stored in the list 39-A) to a current metadata state indicated by the in-memory metadata cache 38 in the form of a single transaction.

For example, since the first modification (as indicated by the first change description 40 stored in the list 39-A) involves adding two blocks of data to the end of the file 66(*a*) (which, let us assume, has 42 complete blocks after committing the prior modification in method 200), the following metadata changes will be induced:

1) Mark blocks 912-913 as allocated in the block allocation bitmap
2) Add a pointer towards block 912 at offset 42 of the file 66(*a*) (which would be at offset 42−18=24 of the first indirect block 60 of the file 66(*a*), if an inode 58 contains up to 18 direct pointers) and a pointer towards block 913 at offset 43 of the file 66(*a*) (which would be at offset 43−18=25 of the first indirect block 60 of the file 66(*a*), if an inode 58 contains up to 18 direct pointers).
3) Update the inode 58 of the file with the current time as the mtime and the atime and with a new file size (e.g., 44×8 KB=352 KB).

Also, since the second modification (as indicated by the second change description 40 stored in the list 39-A) involves adding three blocks of data to the end of the file 66(*a*) (which, let us assume, has 44 complete blocks after the first modification), the following metadata changes will be induced:

1) Mark blocks 937-939 as allocated in the block allocation bitmap
2) Add a pointer towards block 937 at offset 44 of the file 66(*a*) (which would be at offset 44−18=26 of the first indirect block 60 of the file 66(*a*), if an inode 58 contains up to 18 direct pointers), a pointer towards block 938 at offset 45 of the file 66(*a*) (which would be at offset 45−18=27 of the first indirect block 60 of the file 66(*a*), if an inode 58 contains up to 18 direct pointers), and a pointer towards block 939 at offset 46 of the file 66(*a*) (which would be at offset 46−18=28 of the first indirect block 60 of the file 66(*a*), if an inode 58 contains up to 18 direct pointers).
3) Update the inode 58 of the file with the current time as the mtime and the atime and with a new file size (e.g., 47×8 KB=376 KB).

In order to make these metadata changes concrete, the first thread 37-1 will first make sure that the current metadata 48 pertaining to the file 66(*a*) is available in the in-memory metadata cache 38; if not, it will load the current metadata 48 pertaining to the file 66(*a*) from the persistent storage 44 into the in-memory metadata cache 38. In one embodiment, first thread 37-1 will also load a copy of the inode 58 of the file 66(*a*) into a copy separate from the memory metadata cache 38 so that it can modify it. First thread 37-1 may also load byte int(912/8)=114 and byte int(937/8)=117 of the block allocation bitmap (let us assume byte 114 is equal to 00000000, indicating that blocks 912-919 are unallocated currently and byte 117 is equal to 00000000, indicating that blocks 936-943 are unallocated currently). The first thread 37-1 will then sequentially read and process the changes 40 from the list 39-A with respect to the loaded metadata to generate the condensed metadata transaction entry 42. Thus, the condensed metadata transaction entry 42 will include the following 3 instructions:

1) Store 11000000 in byte 114 of the block allocation bitmap and 01110000 in byte 117 of the block allocation bitmap 2) Store the 8-byte value (presented in hexadecimal for brevity) 0000000000000390 at pointer offset 24 of the indirect block, 0000000000000391 at pointer offset 25 of the indirect block, 00000000000003A9 at pointer offset 26 of the indirect block, 00000000000003AA at pointer offset 27 of the indirect block, and 00000000000003AB at pointer offset 28 of the indirect block 3) Store the following inode (not depicted, for brevity, but it should include the updates mtime, atime, and file size=376 KB) in place of the current inode.

It should be noted that only one copy of the inode 58 is stored within the condensed metadata transaction entry 42, rather than having one copy within each of two uncondensed metadata transaction entries 42 which would be used in the prior art, thereby saving about 256 bytes of storage space.

In step 330, first thread 37-1 stores the condensed metadata transaction entry 42 within transaction buffer 41 to be queued up to be written to the metadata transaction log 52 on persistent storage 44 as soon as possible. It should be understood that, in some embodiments, steps 320 and 330 are performed simultaneously, first thread 37-1 generating the condensed metadata transaction entry 42 directly within the transaction buffer 41. At this point, first thread 37-1 must pause until it receives confirmation that the contents of transaction buffer 41 have been flushed to persistent storage 44 within metadata transaction log 52.

In some embodiments, for purposes of simplifying log management, all metadata transaction entries 42, when stored within metadata transaction log 52, are aligned to begin at a sector boundary. Thus, since the techniques presented herein in the context of methods 100 and 300 permit multiple client file change requests 35 (e.g., client file change requests 35-1 and 35-2) to result in only a single condensed metadata transaction entry 42, space is saved within the metadata transaction log 52 to the extent that padding between metadata transaction entries 42 has been reduced.

In step 340, upon receiving confirmation that the condensed metadata transaction entry 42 has been persistently stored in the metadata transaction log 52, the first thread 37-1 wakes up and operates to store updated metadata 48 pertaining to the file 66(*a*) consistent with the condensed metadata transaction entry 42 in the in-memory metadata cache 38 and then unlock the file 66(*a*). At this time, first thread 37-1 may also report back to the client 31 that the first modification has been completed and the first thread 37-1 may then terminate. At this time, second thread 37-2 (as well as any other threads which paused prior to step 130) may also report back to the client 31 that the second (or respective) modification has been completed and the second (or respective) thread 37-2 may then terminate. At some point after this is done, in a background process, the updated metadata 48 pertaining to the file 66(*a*) consistent with the condensed metadata transaction entry 42 will also be committed to the persistent storage 44 in-place, at which point, the condensed metadata transaction entry 42 may be removed from the metadata transaction log 52. However, this is not urgent and does not hold up unlocking the file 66(*a*), reporting back to the client 31, or allowing the respective threads 37 to die.

In addition, if any additional client file change requests 35 (e.g., requests 35-3, 35-*n*) for the same file 66(*a*) are processed (similar to steps 110-122 or 120-122, since the file 66(*a*) is locked) while the file 66(*a*) is re-locked during steps 310-340, then a method similar to method 100 may be performed for those additional client file change requests 35-3, 35-*n* but using a backup list 39-A' instead of main list 39-A, since main list 39-A is still in-use. Thus, as soon as the file 66(*a*) is unlocked by first thread 37-1 in step 340, any pending additional client file change requests 35-3, 35-*n* waiting for the file 66(*a*) to be unlocked may proceed to be committed to storage in a step similar to step 130 (or method 300).

In addition, if after completion of method 300 an additional client file change request 35 (e.g., request 35-3) for the same file 66(*a*) is processed (similar to steps 210-220 since the file 66(*a*) is not locked), then a method similar to method 200 may be performed for that additional client file change request 35-3, but any further additional client file change requests 35 while the file 66(*a*) is locked during the method would be processed according to method 100 again.

As soon as the file 66(*a*) is unlocked by first thread 37-1 in step 340, any pending modifications from threads waiting for the file 66(*a*) to be unlocked may proceed to be committed to storage in step 130.

Thus, techniques have been described involving combining several concurrent changes into one consistent condensed transaction 42 within a metadata transaction log 52 using an accumulation list 39 that can be processed to generate a single transaction 42 which may be quickly stored in the metadata transaction log 52. The improved techniques thus reduce latencies for later concurrent changes and save space within the metadata transaction log 52.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "background" or "conventional," Applicants make no admission that such technique, method, apparatus, or other concept is actually prior art under 35 U.S.C. §102, such determination being a legal determination that depends upon many factors, not all of which are known to Applicants at this time.

What is claimed is:

1. A method performed by a computing device for logging metadata changes of a filesystem, the method comprising:
   receiving, from a client, a first change request directing the filesystem to make a first modification to a file;
   operating a first processing thread on the computing device to perform processing for making the first modification to the file;
   receiving, from a client, a second change request directing the filesystem to make a second modification to the file;
   operating a second processing thread in parallel with the first thread on the computing device, the second thread performing processing for making the second modification to the file;
   storing, by the first thread, a description of the first modification in a list stored in system memory in response to the file being in a locked state;
   storing, by the second thread, a description of the second modification in the list stored in system memory in response to the file continuing to be in a locked state; and
   in response to detecting that the file has been unlocked, saving a condensed metadata transaction entry to a metadata transaction log in persistent storage, the condensed metadata transaction entry providing, in the form of a single transaction, metadata changes required for implementing both the first modification and the second modification.

2. The method of claim 1 wherein the method further comprises:
   receiving, from the client, a prior change request directing the filesystem to make a modification to the file;
   operating another processing thread on the computing device, the other thread performing processing for making the modification to the file;
   operating the other thread to lock the file prior to storing by the first thread and storing by the second thread;
   after locking the file, generating, by the other thread, a metadata transaction entry by providing metadata changes required for implementing the modification;
   buffering, by the other thread, the generated metadata transaction entry in a transaction buffer of system memory prior to the generated metadata transaction entry being persistently stored in the metadata transaction log; and
   the other thread, upon receiving confirmation that the generated metadata transaction entry has been persistently stored in the metadata transaction log, (1) updating an in-memory metadata cache to be in a state indicated by the generated metadata transaction entry, and (2) unlocking the file.

3. The method of claim 1, wherein saving the condensed metadata transaction entry to the metadata transaction log includes, by operation of one of the first thread and the second thread:
   locking the file;
   generating the condensed metadata transaction entry by providing metadata changes required to update an in-memory metadata cache with both the first modification and the second modification;
   prior to persistently storing the generated condensed metadata transaction entry to the metadata transaction log, buffering the generated condensed metadata transaction entry in a transaction buffer of system memory; and
   upon receiving confirmation that the condensed metadata transaction entry has been persistently stored in the metadata transaction log, (1) updating the in-memory metadata cache to be in a state indicated by the generated condensed metadata transaction entry, and (2) unlocking the file.

4. The method of claim 3 wherein the method further comprises:
   receiving, from the client, a third change request directing the filesystem to make a third modification to the file;
   operating a third processing thread on the computing device, the third thread performing processing for making the third modification to the file;
   subsequent to one of the first thread and the second thread unlocking the file, operating the third thread to lock the file;
   after locking the file, generating, by the third thread, a new metadata transaction entry by providing metadata changes required to update the in-memory metadata cache with the third modification;
   buffering, by the third thread, the generated new metadata transaction entry, in the transaction buffer of memory prior to the generated new metadata transaction entry being persistently stored in the metadata transaction log; and
   the third thread, upon receiving confirmation that the generated new metadata transaction entry has been persistently stored in the metadata transaction log, (1) updating an in-memory metadata cache to be in a state indicated by the generated metadata transaction entry, and (2) unlocking the file.

5. The method of claim 3 wherein the method further comprises:
   receiving, from the client, a third change request directing the filesystem to make a third modification to the file;
   operating a third processing thread in parallel with the first thread and the second thread on the computing device, the third thread performing processing for making the third modification to the file;
   receiving, from the client, a fourth change request directing the filesystem to make a fourth modification to the file;
   operating a fourth processing thread in parallel with the first thread, the second thread, and the third thread on the computing device, the fourth thread performing processing for making the fourth modification to the file;
   in response to the file being in a locked state subsequent to one of the first thread and the second thread locking the file, storing, by the third thread, a description of the third modification in another list stored in system memory;
   in response to the file continuing to be in the locked state subsequent to one of the first thread and the second thread locking the file, storing, by the fourth thread, a description of the fourth modification in the other list stored in system memory; and
   in response to detecting that the file has been unlocked, saving another condensed metadata transaction entry to the metadata transaction log, the other condensed metadata transaction entry providing, in the form of a single transaction, metadata changes required for implementing both the third modification and the fourth modification in the form of a single transaction.

6. The method of claim 3 wherein the first change request is a write command and the first modification to the file is an append operation and the second change request is a write command and the second modification to the file is an append operation.

7. The method of claim 6 wherein:
- storing the description of the first modification in the list includes:
  - storing a first address range of a first set of blocks of data to be appended to the file within the description of the first modification; and
  - storing a first logical position within the file where the first set of blocks of data is to be appended within the description of the first modification; and
- storing the description of the second modification in the list includes:
  - storing a second address range of a second set of blocks of data to be appended to the file within the description of the second modification; and
  - storing a second logical position within the file where the second set of blocks of data is to be appended within the description of the second modification.

8. The method of claim 7 wherein generating the condensed metadata transaction entry includes:
- reading a current inode of the file from the in-memory metadata cache;
- modifying a file size parameter of the read current inode based on a resulting size of the file after appending the first set of blocks of data and the second set of blocks of data to the file;
- modifying a file modification time parameter of the read inode to reflect a current time; and
- including a single copy of the read inode as modified within the condensed metadata transaction entry.

9. The method of claim 7 wherein generating the condensed metadata transaction entry includes:
- including, within the condensed metadata transaction entry, a set of instructions to insert a pointer to each block of the first set of blocks of data at a respective offset location of an indirect block of the file corresponding to a logical position within the file where that block of data is appended; and
- including, within the condensed metadata transaction entry, a set of instructions to insert a pointer to each block of the second set of blocks of data at a respective offset location of an indirect block of the file corresponding to a logical position within the file where that block of data is appended.

10. The method of claim 1 wherein storing the condensed metadata transaction entry to the metadata transaction log is performed by the first thread.

11. The method of claim 1 wherein storing the condensed metadata transaction entry to the metadata transaction log is performed by the second thread.

12. The method of claim 1 wherein the metadata transaction log in persistent storage is a circular log that persistently stores a set of metadata transaction entries in sequence.

13. The method of claim 1 wherein the file is in the locked state due to another thread placing the file in the locked state, the other thread operating to process another change request directing the filesystem to make another modification to the file, the other change request having been received from the client prior to the first change request and the second change request.

14. A computer program product comprising a non-transitory computer-readable storage medium storing a set of instructions, which, when executed by a computing device, cause the computing device to perform the operations of:
- receiving, from a client, a first change request directing a filesystem to make a first modification to a file;
- operating a first processing thread on the computing device to perform processing for making the first modification to the file;
- receiving, from the client, a second change request directing the filesystem to make a second modification to the file;
- operating a second processing thread in parallel with the first thread on the computing device, the second thread performing processing for making the second modification to the file;
- storing, by the first thread, a description of the first modification in a list stored in system memory in response to the file being in a locked state;
- storing, by the second thread, a description of the second modification in the list stored in system memory in response to the file continuing to be in a locked state; and
- in response to detecting that the file has been unlocked, saving a condensed metadata transaction entry to a metadata transaction log in persistent storage, the condensed metadata transaction entry providing, in the form of a single transaction, metadata changes required for implementing both the first modification and the second modification in the form of a single transaction.

15. The computer program product of claim 14 wherein the set of instructions, when executed by the computing device, further cause the computing device to perform the operations of:
- receiving, from the client, a prior change request directing the filesystem to make a modification to the file;
- operating another processing thread on the computing device, the other thread performing processing for making the modification to the file;
- operating the other thread to lock the file prior to storing by the first thread and storing by the second thread;
- after locking the file, generating, by the other thread, a metadata transaction entry by providing metadata changes required for implementing the modification;
- buffering, by the other thread, the generated metadata transaction entry in a transaction buffer of system memory prior to the generated metadata transaction entry being persistently stored in the metadata transaction log; and
- the other thread, upon receiving confirmation that the generated metadata transaction entry has been persistently stored in the metadata transaction log, (1) updating an in-memory metadata cache to be in a state indicated by the generated metadata transaction entry, and (2) unlocking the file.

16. The computer program product of claim 14 wherein the set of instructions, when executed by the computing device, further cause the computing device to perform the operations of:
- locking the file;
- generating the condensed metadata transaction entry by providing metadata changes required to update an in-memory metadata cache with both the first modification and the second modification;
- prior to persistently storing the generated condensed metadata transaction entry to the metadata transaction log, buffering the generated condensed metadata transaction entry in a transaction buffer of system memory; and
- upon receiving confirmation that the condensed metadata transaction entry has been persistently stored in the metadata transaction log, (1) updating the in-memory metadata cache to be in a state indicated by the generated condensed metadata transaction entry, and (2) unlocking the file.

17. The computer program product of claim 16 wherein the set of instructions, when executed by the computing device, further cause the computing device to perform the operations of:
- receiving, from the client, a third change request directing the filesystem to make a third modification to the file;
- operating a third processing thread on the computing device, the third thread performing processing for making the third modification to the file;
- subsequent to one of the first thread and the second thread unlocking the file, operating the third thread to lock the file;
- after locking the file, generating, by the third thread, a new metadata transaction entry by providing metadata changes required to update the in-memory metadata cache with the third modification;
- buffering, by the third thread, the generated new metadata transaction entry, in the transaction buffer of memory prior to the generated new metadata transaction entry being persistently stored in the metadata transaction log; and
- the third thread, upon receiving confirmation that the generated new metadata transaction entry has been persistently stored in the metadata transaction log, (1) updating an in-memory metadata cache to be in a state indicated by the generated metadata transaction entry, and (2) unlocking the file.

18. The computer program product of claim 16 wherein the set of instructions, when executed by the computing device, further cause the computing device to perform the operations of:
- receiving, from the client, a third change request directing the filesystem to make a third modification to the file;
- operating a third processing thread in parallel with the first thread and the second thread on the computing device, the third thread performing processing for making the third modification to the file;
- receiving, from the client, a fourth change request directing the filesystem to make a fourth modification to the file;
- operating a fourth processing thread in parallel with the first thread, the second thread, and the third thread on the computing device, the fourth thread performing processing for making the fourth modification to the file;
- in response to the file being in a locked state subsequent to one of the first thread and the second thread locking the file, storing, by the third thread, a description of the third modification in another list stored in system memory;
- in response to the file continuing to be in the locked state subsequent to one of the first thread and the second thread locking the file, storing, by the fourth thread, a description of the fourth modification in the other list stored in system memory; and
- in response to detecting that the file has been unlocked, saving another condensed metadata transaction entry to the metadata transaction log, the other condensed metadata transaction entry providing, in the form of a single transaction, metadata changes required for implementing both the third modification and the fourth modification in the form of a single transaction.

19. The computer program product of claim 16 wherein the first change request is a write command and the first modification to the file is an append operation and the second change request is a write command and the second modification to the file is an append operation.

20. The computer program product of claim 19 wherein:
- the instructions for storing the description of the first modification in the list, when executed by computing device cause the computing device to perform the operations of:
  - storing a first address range of a first set of blocks of data to be appended to the file within the description of the first modification; and
  - storing a first logical position within the file where the first set of blocks of data is to be appended within the description of the first modification; and
- the instructions for storing the description of the second modification in the list, when executed by computing device cause the computing device to perform the operations of:
  - storing a second address range of a second set of blocks of data to be appended to the file within the description of the second modification; and
  - storing a second logical position within the file where the second set of blocks of data is to be appended within the description of the second modification.

21. The computer program product of claim 20 wherein the instructions for generating the condensed metadata transaction entry, when executed by computing device cause the computing device to perform the operations of:
- reading a current inode of the file from the in-memory metadata cache;
- modifying a file size parameter of the read current inode based on a resulting size of the file after appending the first set of blocks of data and the second set of blocks of data to the file;
- modifying a file modification time parameter of the read inode to reflect a current time; and
- including a single copy of the read inode as modified within the condensed metadata transaction entry.

22. An apparatus comprising:
- persistent storage, the persistent storage storing a filesystem, the filesystem including a metadata transaction log stored on the persistent storage, the filesystem storing a file on the persistent storage;
- system memory, the system memory storing a list; and
- a set of processors configured to perform the following operations:
  - receiving, from a client, a first change request directing the filesystem to make a first modification to the file;
  - operating a first processing thread on the computing device to perform processing for making the first modification to the file;
  - receiving, from the client, a second change request directing the filesystem to make a second modification to the file;
  - operating a second processing thread in parallel with the first thread on the computing device, the second thread performing processing for making the second modification to the file;
  - storing, by the first thread, a description of the first modification in the list stored in system memory in response to the file being in a locked state;
  - storing, by the second thread, a description of the second modification in the list stored in system memory in response to the file continuing to be in a locked state; and
  - in response to detecting that the file has been unlocked, saving a condensed metadata transaction entry to the metadata transaction log in persistent storage, the condensed metadata transaction entry providing, in the form of a single transaction, metadata changes required for implementing both the first modification and the second modification.

* * * * *